T. McCREARY.
Thill Coupling.
No. 80,360. Patented July 28, 1868.
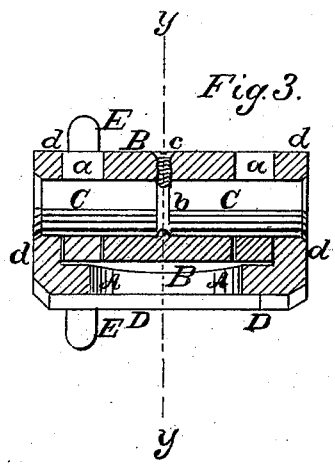
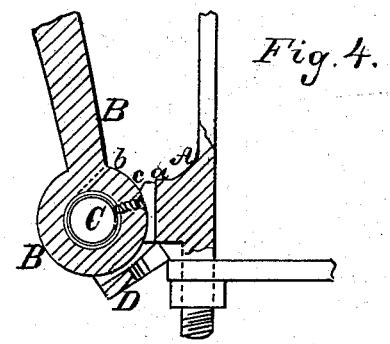
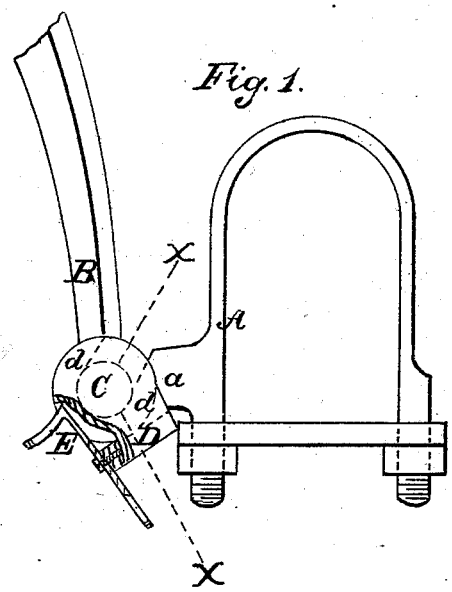
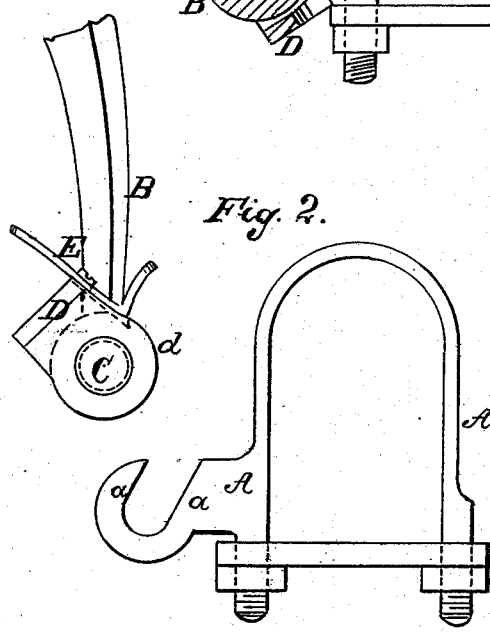
Witnesses
Wm. A. Morgan
G. C. Cotton
Inventor
T. McCreary
per Munn & Co.
Attorneys

United States Patent Office.

THOMAS McCREARY, OF MATTEAWAN, NEW YORK, ASSIGNOR TO HIMSELF, GEORGE M. SULLIVAN, AND JOHN McCREARY, OF THE SAME PLACE.

Letters Patent No. 80,360, dated July 28, 1868.

IMPROVEMENT IN CARRIAGE-CLIP.

The Schedule referred to in these Letters Patent and making part of the same.

TO ALL WHOM IT MAY CONCERN:

Be it known that I, THOMAS McCREARY, of Matteawan, in the county of Dutchess, and State of New York, have invented a new and useful Improvement in Carriage-Clips; and I do hereby declare that the following is a full, clear, and exact description thereof, which will enable others skilled in the art to make and use the same, reference being had to the accompanying drawings, forming part of this specification, in which—

Figure 1 represents a side view, partly in section, of my improved carriage-clip.

Figure 2 is a side view of the same, showing the clip and thill separated.

Figure 3 is a longitudinal section of the device, the plane of section being indicated by the line $x\ x$, fig. 1.

Figure 4 is a detail transverse section of the same, taken on the plane of the line $y\ y$, fig. 3.

Similar letters of reference indicate corresponding parts.

This invention relates to a new device for connecting the shaft of a carriage with the front axle of the same, by means of a pivot, which will not rattle, which cannot easily get out of order, and which can be readily removed, to allow the shaft to be taken off.

The invention consists in securing the pivot to the end of the shaft, and not to the clip, as usual, and in then hanging it loose in the ears of the clip, and in locking it to the same by means of a spring-catch.

A, in the drawing, represents the clip or bow. It is fastened to the axle in the ordinary, or in suitable manner.

$a\ a$ are the ears projecting from the clip. These ears are not perforated, but are slotted, as in fig. 2.

B is the shaft. On its rear end is formed an eye, in which the pivot C is held. The pivot has a groove, $b$, into which the end of a screw, $c$, fits, said screw being secured in the shaft, as shown. The pin is thus held on the shaft, so that it cannot slide in it, nor fall out, while it can freely turn.

D is a metal strap, in form of a flat or other bar, with projecting ears $d$, formed at its ends.

The pin C, is with its ends, firmly secured to the ends $d$ of the strap D, so that the strap will turn with the pin.

The ears of the clip fit between the shaft B and the ears $d$, in the manner shown in fig. 3.

The shaft is hung to the clip by placing the pin C into the slots of the ears $a$.

E is a spring-catch, fastened to the strap D. It fits into a notch formed in one of the ears $a$, as in figs. 1 and 2. When the shaft is hung, the strap is turned around the pin C, until the catch E fits into the notch. The strap is then locked, and with it, the pin, which cannot turn in the ears $a$, while the shaft can freely turn around the pin.

It is evident that the strap D can have its ears come between the shaft and the ears $a$, although the manner shown in fig. 3 is the most convenient, all the parts being best balanced.

Having thus described my invention, I claim as new, and desire to secure by Letters Patent—

1. A carriage-clip, in which the pivot C is swivelled in the shaft, and inserted from above, into the slotted ears of the clip, and fastened to the latter by means of a spring-catch, E, or its equivalent.

2. The strap D, when rigidly secured to the pivot-pin C of a carriage-clip, for holding the spring-catch E, and for preventing the pin from turning, as set forth.

3. A carriage-thill coupling, consisting of the clip A, shaft B, pin C, strap D, and catch E, all made and operating substantially as herein shown and described.

THOMAS McCREARY.

Witnesses:
NATHAN C. ROBINSON,
WILLIAM LOUGHRAN.